Oct. 29, 1935.  E. B. HALLMAN  2,019,410
AUTOMOTIVE HEADLIGHT
Filed May 6, 1933  2 Sheets-Sheet 1
Fig. 1.
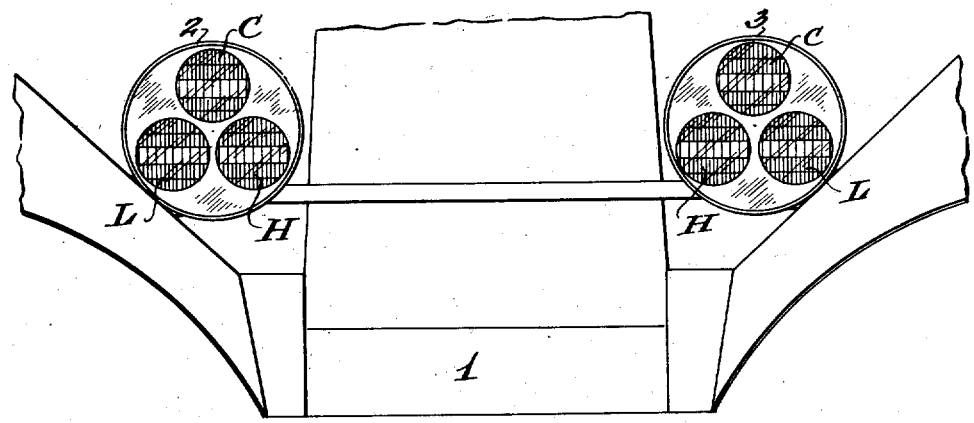
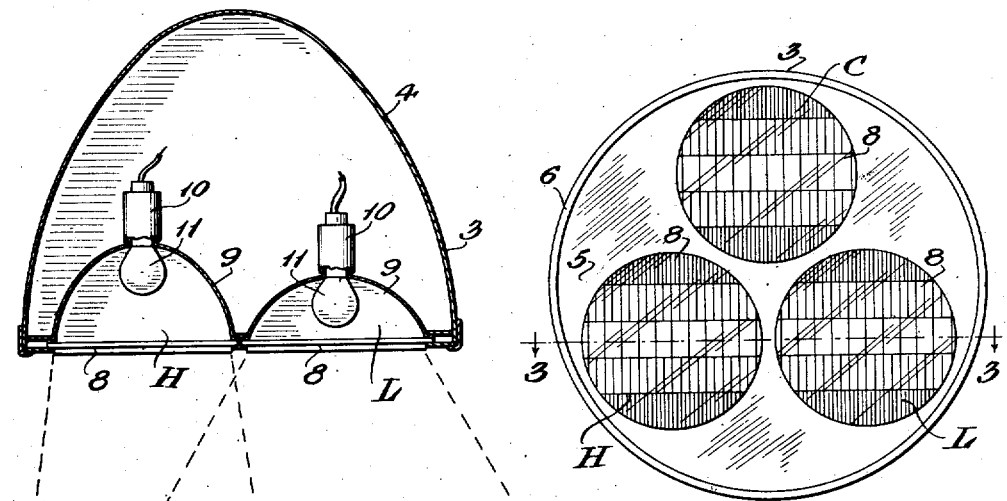
Fig. 2.
Fig. 3.
Inventor
Eric B. Hallman.
By William C. Linton.
Attorney Oct. 29, 1935.  E. B. HALLMAN  2,019,410
AUTOMOTIVE HEADLIGHT
Filed May 6, 1933  2 Sheets-Sheet 2

Inventor
*Eric B. Hallman.*
By *William C. Linton.*
Attorney

Patented Oct. 29, 1935

2,019,410

UNITED STATES PATENT OFFICE 2,019,410

AUTOMOTIVE HEADLIGHT

Eric B. Hallman, Norristown, Pa.

Application May 6, 1933, Serial No. 669,762

4 Claims. (Cl. 240—7.1)

The present invention relates to lighting systems and more particularly to headlight illumination for motor vehicles, having among its principal objects, the provision of means for meeting the present day automotive headlighting requirements from the driver's point of view, in that various light beam patterns may be projected upon a highway, one of which meets the requirement for safety when the vehicle is traveling at a maximum speed along reasonably straight roads for making visible large objects, at at least five hundred feet, with a minimum amount of light in the foreground, light both above and below the horizontal and a comparatively small horizontal beam spread; a second light beam pattern for meeting the requirement for safety and traveling at relatively low speed along winding roads with sufficient illumination for visibility of large objects of between two hundred and two hundred fifty feet distant, a fairly high intensity of light in the foreground, and a wide beam spread; and, still another light beam pattern capable of use when passing approaching vehicles or when driving over lighted streets which produces sufficient illumination for visibility of large objects of only one hundred fifty to two hundred feet distant, all of the light to be below the horizontal, the foreground being well lighted and the beam spread reasonably wide.

Another object of the present invention is to provide a lamp for headlight illumination of the character aforesaid, having a plurality of separate and definite beam patterns, each pattern being provided with a suitable light source, and means for manually or automatically controlling each light source whereby varying light beams may be projected with sufficient illumination for safe driving without visual annoyance to the driver of an approaching vehicle.

Other objects of the invention will be in part obvious and in part pointed out hereinafter.

In order that the invention and its mode of operation may be readily understood by persons skilled in the art I have in the accompanying illustrative drawings and in the detailed following description based thereon, set out an embodiment of the same.

In these drawings:

Figure 1 is a fragmentary front elevation of a motor vehicle having headlamps embodying the present invention mounted thereupon;

Figure 2 is an enlarged front elevation of one of the headlamps;

Figure 3 is a horizontal section taken on the line 3—3 of Figure 2, and

Figure 4:
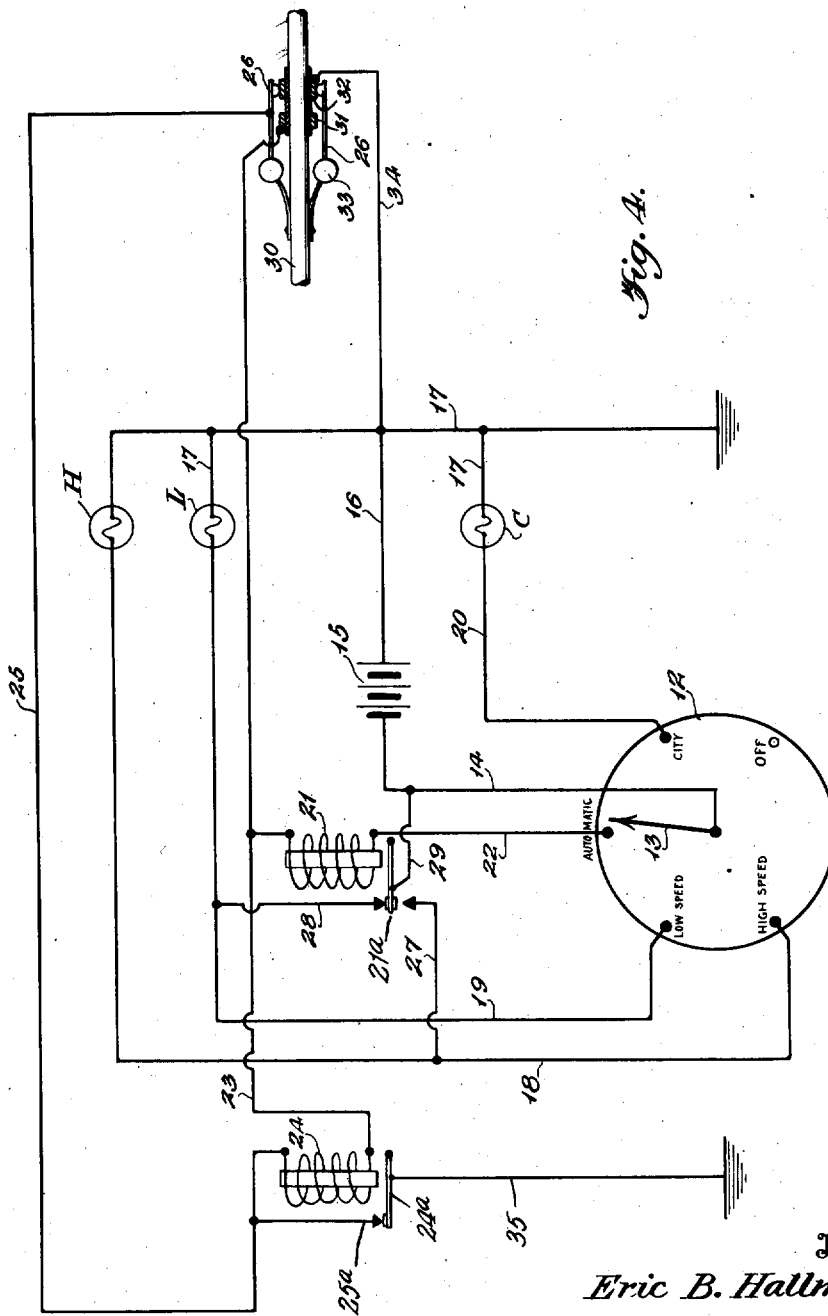
Figure 4 is a diagrammatical view of a wiring system which may be used in connection with my method and apparatus for illumination.

Referring now more particularly to the accompanying drawings wherein like corresponding parts are designated by similar reference characters throughout the several views, I have herein shown in Figure 1, for convenience, a portion of the forward end of an automobile 1 having mounted thereupon in the usual manner, a pair of headlamps 2 and 3. Each headlamp comprises a casing 4 which may be of any conventional design, but preferably of that design as herein shown having its forward end open and this open forward end being covered by a plate 5. This plate 5 is connected to the casing 4 by means of the rim 6 and has formed therein a plurality of openings, preferably three in number, as herein shown, each opening being covered by means of a lens 8. Secured to the rear face of this plate or disk 5 in any suitable manner are the reflectors 9, each carrying a lamp socket 10 having positioned therein a lamp 11.

The arrangement of the reflectors, lamps and lenses within each headlamp is for the purpose of producing a multiple number of light sources, each one providing a definite beam pattern designed for satisfactory illumination under certain conditions encountered by the driver of the automobile, in that the lamp H is so designed as to meet the requirements for safety in traveling over a highway at a maximum speed along reasonably straight roads, in order that visibility of large objects may be seen at at least five hundred feet distant, a minimum light beam projected in the foreground with light above and below the horizontal, and a comparatively small horizontal beam spread. The lamp L is to be brought in use when traveling over the highways at a relatively low speed in order to obtain sufficient illumination for visibility of large objects of only two hundred to two hundred fifty feet distant, with a fairly high intensity of light in the foreground and a relatively wide beam spread. When passing approaching vehicles, or when driving over lighted streets another type of beam pattern is desired for safety, this being projected from the lamp C. The light beam projected from the lamp C will provide sufficient illumination for visibility of large objects of only one hundred fifty to two hundred feet distant, all of the light to be below the horizontal, the beam spread should be reasonably wide and with considerable light being projected on the immediate foreground of the automobile.

A headlamp capable of projecting light beam patterns of the character aforesaid should meet the requirements from the driver's standpoint of view in automotive headlighting, and the three lamps are preferably arranged within a single casing, but it is to be herein understood that these various lamps may be arranged in any other manner upon the motor vehicle, or any number of light beam patterns may be employed, as are needed to meet the requirements for night driving.

As the lamps within the headlamps are never jointly illuminated and only one light beam is projected at a time, I have shown in Figure 4 of the drawings, an electrical wiring system for controlling the flow of current to the lamps 11. In this diagram the lamps are designated by the letters H, L and C to correspond with the particular light beam pattern projected from the headlamp as is shown in the remaining figures of the drawings. In this wiring diagram, I have included a five point switch 12 which may be arranged upon the steering wheel or the dashboard of a motor vehicle, as is convenient to the driver, and is provided with a rotatable contact arm 13 which latter may be then manually moved by the operator, and this movable contact arm 13 is electrically connected by the connection 14 to a battery 15. Electrically connected to the cable 16 running from the battery 15 are the wires 17 which lead to the lamps herein designated by the letters H, L and C. The lamp H also is connected by the wire 18 to the contact point arranged upon the switch 12 and herein designated as "High speed", the lamp L being connected through the wiring 19 to the contact point designated by "Low speed" upon this switch 12, whereas the lamp C is connected through the wire 20 to the contact point designated upon the switch as "City". The operator, by revolving the movable contact 13 may close any one of the circuits in which these lamps H, L and C are included, whereby the desired light beam pattern may be obtained.

At times, it becomes desirable to automatically control the flow of current to the respective lamps in order that sufficient illumination may be had when traveling over the highway at the maximum speed, and as the speed of the motor vehicle is reduced, the headlighting will be changed to give sufficient illumination directly in front of the motor vehicle, or it may even be desirable to change the illumination to meet requirements for city driving and accordingly, I have included in the lighting circuit herein shown, means for automatically controlling the flow of current to the high speed lamp H and the low speed lamp L according to the speed of travel of the motor vehicle.

The winding of the relay 21 is connected to the contact designated by the word "Automatic" upon the switch 12, by means of a conductor 22 and also connected to the winding of this relay 21 is a wire 23 which latter is connected with the winding of the second relay which is a holding relay and is herein designated by the numeral 24. A wire 25 leads from the winding of this holding relay 24 and is connected to the contact arms 26. The movable switch blade 21a of the relay 21 is adapted to form contact with either of the leads 27 or 28 which latter are connected to the wires 18 and 19, respectively, leading to the high speed and low speed lamps. This movable switch blade 21a of the relay 21 is connected through the wiring 29 to the battery 15. The numeral 30 indicates the drive shaft of the motor vehicle, having secured thereto the contact rings 31 and 32, which as shown are spaced apart. Contact ring 31 corresponds to high speed and contact ring 32 to low speed. Also carried by this drive shaft 30 is a governor 33 which latter is adapted to actuate the contact arms 26 in order to bring the same into contact with either of the rings 31 or 32.

When the motor vehicle is traveling at a relatively low rate of speed, and the operator desires to automatically control the flow of current to the lamps H or L, he moves the contact arm 13 of the switch to the contact point designated by the word "Automatic" whereby the current from the battery 15 will flow through the actuating winding of relay 21, pulling up its armature into contact with its upper contact point and closing the circuit through wires 28 and 17 in which the low-speed lamp L is included, and the current will flow through the actuating winding of holding relay 24 and wire 25 to the contact arms 26 of the governor switch and return to the battery or be grounded through the wire 34, since at low speeds, the terminal contact points of arms 26 rest upon low-speed contact ring 32 connected to wire 34. As soon as this current passes through the actuating winding of holding relay 24, its armature 24a is pulled up to engage contact point 25a, and there is a direct return path to the right side of battery 15 from the upper terminal of winding 21 through wire 23, winding 24, contact 25a, armature 24a, wire 35, and the ground. This direct path is in parallel with the path from winding 24 through wire 25, arms 26, ring 32, and wire 34. As long as the armature of holding relay 24 is held closed, it makes no difference whether the circuit is closed through arms 26 and ring 32.

As the speed of the motor vehicle increases, the governor 33 will expand, causing the contact arms 26 to slide away from ring 32 towards ring 31, and as they slide the terminal contact points of arms 26 become disengaged from making contact with slow-speed ring 32. As the speed is picking up, there is then a short time as shown when the terminal contact points of arms 26 make contact with neither ring 32 nor ring 31. During this time, notwithstanding the fact that the circuit from arms 26 to ring 32 is open, the direct return circuit from winding 21 to the right side of battery 15 remains closed, as traced above through winding 24, armature 24a, wire 35, and ground, since nothing has operated to deenergize relay 24. So long as the terminal contacts of arms 26 remain out of contact with both ring 32 and ring 31, the conditions remain as they were when 26 made contact with ring 32, and relay 21 remains energized and its armature remains in engagement with its upper contact, and low-speed light L remains lighted.

However, as the speed of the motor vehicle increases further, the terminal contact points of arms 26 are pulled far enough away from ring 32 to make contact with ring 31. When this occurs, a direct short-circuit is applied to the actuating winding of holding relay 24, and relay 24 is deenergized and its armature releases. This short-circuit is applied through wire 25, arms 26, ring 31, and wire 23. The release of the armature of relay 24 opens the connection from its contact 25a to its armature 24a, and the direct return path is opened from the actuating winding of relay 21 through winding 24 and contact 25a. Control relay 21 is deenergized, and its armature drops from engagement with its upper contact to engagement with its lower contact. The circuit through wires 28 and 17 is opened and slow-speed light L is extinguished.

When the armature of control relay 21 engages its lower contact, the circuit is closed through wire 27 to illuminate high-speed light H, and this light stays on as long as control relay 21 remains deenergized. If the vehicle slows down sufficiently for the terminal contacts on arms 26 to become disengaged from ring 31, but not sufficiently to engage ring 32, the actuating winding of control relay 21 remains deenergized and light H remains on and light L remains off.

As soon however as the vehicle has slowed down enough for the terminal contacts of arms 26 to engage ring 32, the actuating circuits of relays 21 and 24 are again closed, the armature of relay 21 is pulled up, light H goes out, and light L goes on. Therefore, there is a range of intermediate speeds between high speed and low speed for which the lights do not change from their immediately previous condition. Therefore, a short spurt and slowing down does not cause rapid switching from one light to the other.

From the foregoing, it is obvious that I have provided a means for automotive headlighting, consisting of a single casing having arranged therein three separate lamps, each adapted to project a distinctive light beam pattern, and the electric circuit in which the lamps are included is capable of manual or automatic control, whereby the various light beams will be individually projected to meet the various requirements of night driving, not only from the driver's point of view, but which will give the required illumination for others to properly identify the moving vehicle without visual annoyance to drivers of approaching vehicles.

Manifestly, the construction herein shown is capable of considerable modification and such modifications as come within the scope of my claims, I consider within the spirit of my invention.

I claim:

1. An automotive headlighting system comprising a light source adapted to project a high speed light beam pattern, a second light source adapted to project a low speed light beam pattern, an electric circuit for each of said light sources, means controlled by the speed of the vehicle to automatically close either of said circuits, whereby the high speed light beam pattern or the low speed light beam pattern may be projected dependent upon the speed of the vehicle, and means comprising a holding relay for keeping the circuit connections unchanged while said automatic circuit closing means passes from one point to the other.

2. In an automotive vehicle headlight system, a plurality of individual reflectors mounted for delivering beams directed in substantially the same direction, individual electrically actuatable light sources positioned respectively in said reflectors in actuating position, said reflectors having different contours and being adapted to deliver beams of different characteristics, a source of electric energy, means actuatable by the speed of movement of said vehicle for selectively connecting to said source of electric energy a first one of said light sources alone when said vehicle operates within a first determined speed range and for connecting to said source of electric energy a second one of said light sources alone when said vehicle operates within a second determined speed range not contiguous to said first determined speed range, and holding means effective when said vehicle operates at a speed intermediate said determined speed ranges to maintain uninterrupted the connection last previously actuated by said first-mentioned means of said source of electric energy to the one of said light sources corresponding to the one of said determined ranges within which said vehicle last previously operated.

3. In an automotive vehicle headlight system, a plurality of individual reflectors mounted for delivering beams directed in substantially the same direction, individual electrically actuatable light sources positioned respectively in said reflectors in actuating position, said reflectors having different contours and being adapted to deliver beams of different characteristics, a source of electric energy, a speed controlled switch, speed responsive means actuatable by the speed of said vehicle and mounted for actuating said speed controlled switch, a control electromagnetic switch having two contacts and an armature operating therebetween, said source of electric energy being connected between said armature and one side of said speed controlled switch, the actuating winding of said electromagnetic switch being connected between said armature and the other side of said speed controlled switch, each of said light sources having one terminal connected to the side of said source of electric energy which is connected to one side of said speed controlled switch, one of said light sources having its other terminal connected to one contact of said electromagnetic switch, and the other of said light sources having its other terminal connected to the other contact of said electromagnetic switch, whereby one of said light sources is illuminated at a time according to the speed at which said vehicle is operating.

4. In an automotive vehicle headlight system, a plurality of individual reflectors mounted for delivering beams directed in substantially the same direction, individual electrically actuatable light sources positioned respectively in said reflectors in actuating position, a source of electric energy, speed controlled electrical switching means comprising two spaced fixed contact elements and a mobile element adapted in its respective terminal positions to selectively engage said contact elements and having positions of its mobile contact element intermediate the terminal positions thereof for which said mobile contact element engages neither contact element of said switching means, speed responsive means actuatable by the speed of said vehicle and mounted for actuating said speed-controlled switching means, a control electromagnetic switch having two contacts and an armature operating therebetween, said source of electric energy having its ground side connected to the first fixed contact element of said speed controlled switching means and having its high side connected to said armature, each of said light sources having one side connected to the ground side of said source of electric energy, one of said light sources having its other side connected to one contact of said electromagnetic switch, the other of said light sources having its other side connected to the other contact of said electromagnetic switch, and a holding single-contact relay having a first side of its actuating winding connected to the second fixed contact element of said speed controlled switch and having the second side of its actuating winding connected to the mobile contact element of said speed controlled switching means, the armature and contact of said holding relay being connected to connect said second side of the actuating winding of said holding relay to the ground side of said source of electric energy when said relay is actuated, the actuating winding of said control electromagnetic switch being connected between the high side of said source of electric energy and said first side of the actuating winding of said holding relay.

ERIC B. HALLMAN.